3,689,310
POLYESTER AND ACRYLIC RUBBER-URETHANE-
ACRYLATE PAINT AND PAINTING PROCESS
Olin B. Johnson, Livonia, and Santokh S. Labana, Dearborn Heights, Mich., assignors to Ford Motor Company, Dearborn, Mich.
No Drawing. Filed Dec. 21, 1970, Ser. No. 100,494
Int. Cl. C08g 41/04, 22/00
U.S. Cl. 117—93.31                                    10 Claims

ABSTRACT OF THE DISCLOSURE

A radiation-curable paint binder dispersion comprises vinyl monomers, and alpha-beta olefinically unsaturated polyester resin having molecular weight in excess of about 1,000, and the addition product of a hydroxy-functional acrylic rubber particle, a diisocyanate and a hydroxyalkyl acrylate. The dispersion is applied to substrates as a paint film and cured thereon by exposure to ionizing radiation, e.g., an electron beam.

THE INVENTION

A unique, rubber comprising, radiation-curable paint is provided by preparing a film-forming dispersion of vinyl monomers, an alpha-beta olefinically unsaturated polyester resin, and the addition product of a particle of a hydroxy-functional, elastomeric, crosslinked, acrylic polymer, a diisocyanate and a hydroxyalkyl acrylate. The dispersion is applied to substrates, e.g., wood, metal, glass, shaped polymeric solid etc., and cured thereon by ionizing radiation.

(I) The polyester resin component

The alpha-beta olefinically unsaturated polyesters used herein advantageously have average molecular weight in the range of about 1,000 to about 20,000, preferably in the range of about 2,000 to about 10,000. The polyester advantageously has about 0.5 to about 5, preferably about 0.7 to about 3.5 units of alpha-beta olefinic unsaturation per 1,000 units molecular weight.

The polyesters used herein most commonly consist essentially of carbon, hydrogen and oxygen. In one embodiment, the polyesters are those formed from a polyhydric alcohol, e.g., neopentyl glycol, and alpha-beta olefinically unsaturated dicarboxylic acid and/or anhydride, e.g., maleic anhydride, and a dicarboxylic acid and/or anhydride wherein the acid groups and/or anhydride groups are attached to a ring structure, e.g., tetrahydrophthalic anhydride.

The term "alpha-beta olefinic unsaturation" as employed herein includes the olefinic unsaturation resulting from the incorporation of maleic acid or anhydride or other acids or anhydride of equivalent unsaturation for purposes of polymerization, into a paint binder component. It also includes a more radiation sensitive olefinic unsaturation such as that provided by acrylic or methacrylic acid or esters thereof. Other acids and/or anhydrides which can be used in this embodiment include, but not by way of limitation, fumaric, itaconic, chloromaleic, dichloromaleic, etc.

The anhydride wherein the anhydride group is attached to a ring structure (aromatic or aliphatic) is selected from anhydrides that will not provide additional alpha-beta olefinic unsaturation units and the relative quantities of the two acids and/or anhydrides are adjusted to provide the desired concentration of such unsaturation. Suitable anhydrides for this purpose include, but not by way of limitation, phthalic, tetrahydrophthalic, cyclohexane dicarboxylic acid anhydride, etc.

The polyhydric alcohol is preferably a diol. Triols and other multi-hydric alcohols can be used but it is advisable to employ such alcohols in minor amounts with a diol, if they are used at all. Suitable diols include, but not by way of limitation, ethylene glycol, propylene glycol, 1,3-butylene glycol, 2-butene-1,4-diol, 1,4-butene glycol, 1,6-hexamethylene glycol, decamethylene glycol, dimethylol benzenes, dihydroxyethyl benzenes, etc.

In another embodiment, the polyester used is a hydroxy-terminated polyester that has been reacted with a hydroxy acrylate, e.g., hydroxyethyl methacrylate, etc. In this embodiment, the starting resin may be an alkyd type polyester which may, but preferably does not, have olefinic unsaturation. Those having olefinic unsaturation may be formed from the monomers listed for the first embodiment while in the saturated alkyds there is substituted succinic, adipic, or similar acid for the maleic or similarly unsaturated acid or anhydride used to prepare the unsaturated polyesters. One mole of these resins is then reacted with an average of about two moles of hydroxyalkyl acrylate.

The more sensitive unsaturation provided by the acrylate effectively reduces the significance of the maleic unsaturation, if any, in the resin. Hence, in such a resin, the practical concentration of alpha-beta olefinic unsaturation is the concentration provided by the acrylate.

In a third embodiment, the polyester is a urethane (diisocyanate) modified polyester.

In a fourth embodiment, the polyester is a siloxane modified polyester.

(II) Preparation of the acrylic rubber particle

The acrylic rubber particle is a crosslinked, elastomeric, acrylic polymer having hydroxy functionality. These particles can be prepared in either an aqueous or organic medium. In one method of preparation, a major amount of monoacrylate is emulsioned copolymerized with a crosslinked amount of di- or tri-functional monomer containing two or more, non-conjugated terminal ethylenic groups, preferably a diacrylate, using a water-soluble free radical initiator and a suitable surfactant to yield a latex of relatively uniform particle size, e.g., 0.05 to 0.2 micron average diameter.

The monoacrylate component of the monomer mixture comprises about 80 to about 98 mole percent of the mixture while the balance, the di- or tri-functional component, constitutes about 2 to about 20 mole percent. The monoacrylate component contains about 65 to about 98, preferably about 70 to about 95, mole percent of a monofunctional, alkyl acrylate and about 2 to about 35, preferably about 5 to about 30, mole percent of a hydroxyalkyl acrylate. The monofunctional, alkyl acrylate is preferaly an ester of a $C_2$–$C_8$ monohydric alcohol and acrylic acid, e.g., ethyl acrylate, butyl acrylate, hexyl acrylate, 2-ethyl hexyl acrylate and/or mixture of the same. Certain other alkyl acrylates may be used when a crosslinked polymer thereof has an appropriate glass transition temperature, e.g., dodecyl acrylate. Butyl acrylate and 2-ethyl hexyl acrylate are the most preferred of the monofunctional, monoacrylates for use in forming this rubber. The hydroxyalkyl acrylate is preferably the ester of either acrylic or methacrylic acid and a $C_2$–$C_3$ diol, e.g., hydroxyethyl acrylate, hydroxyethyl methacrylate, hydroxypropyl acrylate, hydroxypropyl methacrylate, or mixtures of the same. The glass transition temperature of the crosslinked polymer should be such that the particle retains its rubberlike properties at temperatures to which the paint would normally be exposed.

Suitable crosslinking agents include but not by way of limitations, 1,3-butylene diacrylate, 1,3-butylene dimethacrylate, divinyl benzene, 1,6-hexamethylene diacrylate, 1,6-hexamethylene dimethacrylate, 1,1,1-trimethylolethane triacrylate 1,1,1-trimethylolethane trimethacrylate, 1,1,1-trimethylolpropane triacrylate, 1,1,1-trimethylolpropane trimethacrylate, 1,4-dimethylolcyclohexane dimethacrylate, allyl acrylate, allyl methacrylate, methallyl acrylate, methallyl methacrylate, diallyl maleate, diallyl furmarete and allyl phthalate. In one embodiment, the crosslinking agent is a diester of acrylic or methacrylic acid and a $C_2$–$C_8$, preferably a $C_2$–$C_6$, dihydric alcohol. Another embodiment, the crosslinking agent, is a triester of acrylic or methacrylic acid and a $C_2$–$C_8$, preferably a $C_2$–$C_6$, trihydric alcohol.

The polymerization process is continued to yield a stable latex of relatively uniform particle size and composition. The latex is coagulated, washed and dried to yield finely divided powder suitable for use in this invention.

The monomer charge is emulsified by one or more micelle-forming compounds composed of a hydrophobic part, such as a hydrocarbon group containing 8 or more carbon atoms, and a hydrophylic part, such as alkaline metal or ammonium hydroxide groups, phosphate or sulfate partial ester groups, sulfonate groups, and the like. Exemplary emulsifying agents include alkali metal sulfonates of styrene, naphthalene, decyl benzene and dodecyl benzene; sodium dodecyl sulfate; sodium stearate; sodium oleate; sodium alkyl aryl sulfonates; polyoxymethylene sulfates and phosphates; the ethylene oxide compensates with long chain fatty acids, alcohols, and mercaptans and the alkali metal salts of rosin acids. These materials and the techniques of their employment in emulsion formation and maintenance are well known to the art and have no unusual application here. As they are conventional materials employed in a conventional manner, further description and explanation is unnecessary.

A polymerization initiator is composed of one or more water-soluble, free-radial-generating species such as hydrogen peroxide or sodium, potassium, or ammonium persulfates, perborates, peracetates, percarbonates and the like. As is well known in the art, these initiators may be associated with activating systems such as redox systems which may incorporate mild reducing agents such as sulfites and thiosulfites and redox reaction promoters such as transition metal ions.

A chain transfer agent or a mixture of chain transfer agents may be added to the reaction medium to limit the molecular weight of the crosslinked acrylic polymers. Such chain transfer agents are generally mercaptans such as dodecanethiol, benzene thiol, penthane thiol and butylene thiol.

Those skilled in the art will be aware that other emulsifying agents, polymerization initiators and chain transfers may be used when compatible with a polymerization system herein employed. The reaction may be carried out at temperatures from 40° C. to about 80° C., or at lower temperatures, as from 0° C. to 80° C. in the case of activated systems.

Another method of preparation, hereinafter illustrated, the rubber particles are formed in an aliphatic hydrocarbon medium.

(III) THE DIISOCYANATE REACTANT

The preferred diisocyanate for use in this invention is toluene diisocyanate and this may be either the 2,4- or 2,6-isomer or a mixture thereof. This diisocyanate may be used without blocking or one of the isocyanate groups thereof may be blocked with caprolactam or other blocking agents before use. One may also use other diisocyanates so long as one of the isocyanate groups is blocked with caprolactam or other suitable blocking agent. Representative of other diisocyanates which can be blocked are the following: 4,4'-diphenylmethane diisocyanate, 1-phenoxy-2,4-phenylene diisocyanate, 1-tert-butyl-2,4 phenylene diisocyanate, and 1-ethyl-2,4-phenylene diisocyanate. Such blocking allows for separate stage reactions of the two isocyanate groups. Other blocking agents such as phenols and tertiary butyl alcohol may also be used. The blocking agents are selected so that the blocked isocyanate group is converted to free isocyanate groups at a temperature range of about 120° to about 170° C. Sometimes a catalyst such as triethylene diamine or stannous octoate may be advantageously used in 0.05 to 1 percent concentration (basis weight of reactants) to assist the deblocking process. A diisocyanate may be monoblocked with caprolactam by reacting the diisocyanate with caprolactam in toluene. When the first isocyanate group is blocked, the monoblocked product precipitates out of solution. See Raymond R. Myers and J. S. Long, Film-Forming Compositions, vol. 1, Part I, page 485, published by Marcel Dekker Inc., New York, N.Y., U.S.A. (1961).

The reason for using the monoblocked diisocyanates is to assure that only one of the isocyanate groups per diisocyanate molecule will react with the hydroxy functionality of the rubber particle. The second isocyanate group of the molecule is thus left to react with the hydroxy alkyl acrylate thereby providing the addition product with alpha-beta olefinic unsaturation. When an excess of diisocyanate is employed and not removed prior to introduction of the hydroxyalkyl acrylate, there will be formed corresponding amounts of the addition product of one mole diisocyanate and two moles hydroxyalkyl acrylate. This provides no problem since this material is copolymerizable with the other paint binder components, increases the concentration of urethane linkages in the resultant paint film, and serves as a viscosity modifier.

(IV) The hydroxyalkyl acrylate

A hydroxylakyl acrylate is reacted with the second diisocyanate group in the next step of the process. This component is preferably employed in slight excess of the amount required to react with the remaining isocyanate groups. The preferred hydroxyalkyl acrylates are hydroxyethyl acrylate, hydroxyethyl methacrylate, hydroxypropyl acrylate, hydroxypropyl methacrylate, and mixtures of the same.

(V) Vinyl monomers employed in the paint dispersion

The paint dispersion advantageously contains about 20 to about 90, preferably about 30 to about 65, weight percent vinyl monomers and about 10 to about 80, preferably about 35 to about 70, weight percent of the rubber-urethane-acrylate addition product. Monomer type and concentration provide one means for adjusting the viscosity of the paint solution to conform to a method of application desired, e.g., spray coating, roll coating, etc. In functional terms, the amount of vinyl monomer present is at least sufficient to convert the alpha-beta olefinically unsaturated, rubber-urethane-acrylate addition product into a crosslinked continuous coating on the surfaces of a substrate when a film of such coating solution is exposed to ionizing radiation, e.g., an electron beam.

Vinyl monomers employed may be monofunctional, monoacrylates formed by the esterification of acrylic or methacrylic acid and a $C_1$–$C_8$, preferably $C_1$–$C_6$, monohydric alcohol, e.g., methyl methacrylate, ethyl acrylate, butyl acrylate, 2-ethyl hexyl acrylate, etc. The monomer mixture may also include a minor amount, e.g., about 1 to about 30 mole percent of diacrylates, e.g., the diester of acrylic or methacrylic acid in the $C_2$–$C_6$ diol such as ethylene glycol diacrylate, 1,3-butylene diacrylate, 1,3-butylene dimethacrylate, 1,6-hexamethylene diacrylate, 1,6-hexamethylene dimethacrylate, etc.

Monovinyl hydrocarbons, e.g., styrene, alpha-methyl styrene, vinyl toluene, etc., may also be used either alone or in combination with the aforementioned monoacrylates. Minor amounts, about 1 to about 30 mole percent of the vinyl monomer mixture may be made up of divinyl hydrocarbons such as divinyl benzene. Other vinyl monomers, e.g., acrylonitrile, methacrylonitrile, vinyl acetate, etc., may be employed in minor amounts, e.g., about 1 to about 30 mole percent.

Advantageously, at least 70 weight percent of the vinyl monomer component is made up of monoacrylates selected from esters of a $C_1$–$C_8$ monohydric alcohol and acrylic or methacrylic acid and/or monovinyl hydrocarbons having about 8 to about 9 carbon atoms. Frequently, it is advantageous to use a mixture of about 40 to about 60 mole percent of these monoacrylates and about 60 to about 40 mole percent of the monovinyl hydrocarbons.

(VI) Preparation and application of the coating solution to a substrate

By adjusting the viscosity of the coating solution to a viscosity compatible with the desired method of coating, these coatings may be applied by any of the conventional methods, e.g., brushing, spraying, roll coating, curtain coating, flow coating, etc.

The viscosity of the paint binder solution may be adjusted by varying the molecular weight of the rubber-urethane-acrylate addition product. This may be accomplished by controlling the average number of functional groups per molecule through control of the concentration of the hydroxyalkyl acrylate constituent in forming the rubber particle. The viscosity may also be regulated by varying the relative concentration of the resin component with respect to the vinyl monomer component and/or by varying the relative concentration of the similar monomers within the vinyl monomer component. The binder solution may be applied to the substrate essentially free of non-polymerizable, organic solvents and/or diluents or it may be applied with the solvents and/or diluents in a method of application wherein the solvent and/or diluents are flashed off prior to polymerization.

The coatings may be applied to any substrate, e.g., metal, wood, glass, polymeric solids, etc. These coatings will ordinarily be applied to an average depth and range of about 0.1 to about 4 mils, more commonly about 0.5 to about 2 mils.

(VII) Curing of the coating

The films formed on the paints of this invention can be cured with ionizing radiation at relatively low temperatures, e.g., room temperature (20° C. to 25° C.) or a temperature between room temperature and that temperature at which significant vaporization at its most volatile component is initiated, ordinarily between 20° C. and 75° C. The radiation is applied at those rates of about 0.1 to about 100 mrad per second on a workpiece, preferably a moving workpiece, with the coating receiving a total dose in the range of about 1 to about 25, more commonly about 8 to about 15 mrad.

The term "ionizing radiation" as employed herein means radiation having sufficient energy to remove an electron from a gas atom, forming an ion, hence radiation with minimum energy of, or equivalent to, about 5,000 electron volts except when the curing is carried out in a vacuum. The preferred method of curing films of the instant paint binders upon the substrates to which they have been applied is by subjecting such films to a beam of polymerization effecting electrons which at its source of emission is within the range of, or equivalent to, about 100,000 to about 500,000 electron volts. If irradiation is carried out in vacuum or a reduced pressure, this energy may be considerably lower. In this method of curing, it is preferred to employ a minimum of about 25,000 electron volts per inch of distance between the radiation emitter and the workpiece where the intervening space is occupied by air or other gas of comparable density. Adjustment is made for the relative resistance of the intervening gas which is preferably an oxygen-free, inert gas such as nitrogen or helium.

In this application, the term "paint" is meant to include finally ground pigment and/or filler in the binder, the binder without pigment and/or filler or having very little of the same, which can be tinted, if desired. Thus, the binder, which is ultimately converted to a durable film resistant to wear, weather, etc., can be all or virtually all that is used to form the film, or it can be a vehicle for pigmentary and/or mineral filler material.

The abbreviation "mrad" as employed herein means one million rad. The term "rad" as employed herein means that dose of radiation which results in the absorption of 100 ergs of energy per gram of absorber, i.e., coating film. The electron emitting means may be a linear electron accelerator capable of producing a direct current potential in the range herein before mentioned. In such device, electrons are ordinarily emitted from a hot filament and accelerated through a uniform voltage medium. The electron beam, which may be about ⅛ inch in diameter at this point, is then scanned in one direction to make a fan-shaped beam and then passed through a metal window, e.g., aluminum, aluminum-copper alloy, or magnesium-thorium alloy of about 0.003 inch thickness.

This invention will be more fully understood from the following examples:

EXAMPLE 1

(I) Rubber particles are prepared in aqueous medium using the following procedures: Two 1,000 parts by weight water which has been boiled and cooled to room temperature under a nitrogen atmosphere are added 2.86 parts by weight sodium dodecyl sulfate dissolved in 35.7 parts by weight water and about ⅓ of a monomer mixture consisting of 521 parts butyl acrylate and 48.5 parts by weight 1,3-butylene dimethacrylate. This mixture is stirred to establish a dispersion of the monomers and 3.14 parts by weight potassium per sulfate dissolved in 71.4 parts by weight water are added to the stirred mixture. This mixture is heated to 45° C. After about ten minutes, addition of the remainder of this monomer mixture is begun at a rate such that the temperature of the reaction mixture is maintained at 47° to 50° C. During the addition of the last ⅔ of the monomer mixture, 5.72 parts by weight sodium dodecyl sulfate dissolved in 35.7 parts by weight water are added at a substantially constant rate. During the addition of the last one-third of the monomer mixture there are added 65 parts by weight hydroxyethyl acrylate. The reaction mixture is maintained at 47° to 50° C. for about two hours.

The emulsion is then coagulated by addition of about 20 grams of concentrated hydrochloric acid solution and about 100 ml. of water. The rubber particles are isolated by filtration and washed with methanol containing 1 weight percent of hydrochloric acid. The particles are then dried.

(II) Determination of the concentration of reactive hydroxyl groups on the surfaces of the particles is made by the well-known method of analysis wherein the hydroxyl groups are reacted with the acetic anhydride using a pyridine catalyst. The acetic acid is back titrated with sodium hydroxide. For details, reference is made to C. A. Steyermark, Quantitative Organic Analysis, pp. 302–303 published by Blakiston Co., New York, Toronto and Philadelphia (1951).

(III) The hydroxy-functional rubber particles prepared in I above are reacted with a diisocyanate using the following procedures: The hydroxy-functional particles in the quantity providing one mole of reactive hydroxyl groups on the collective surfaces thereof are suspended in toluene and 2,4-toluene diisocyanate, in the quantity necessary to provide about three isocyanate groups per each hydroxyl group, is incrementally added at a rate slow enough to keep the temperature of the reaction mix below 32° C. After the initial exotherm subsides, the reaction mixture is stirred for one hour.

(IV) The rubber-diisocyanate adduct is mixed with a hydroxyalkyl acrylate using the following procedure: The temperature of the reaction mix is raised to about 45° C. and hydroxyethyl methacrylate monomer is added in slight excess (e.g., 5 to 7 percent excess) of that required to react with the unreacted isocyanate groups. It is added slowly and incrementally and the reaction is stirred continuously for several hours. The solvent is removed under vacuum until the solvent content of the product mix is less than 15 percent. The rubber-urethane-acrylate addition product, hereinafter referred to as resin, is ready for employment in coating compositions.

(V) Paint dispersions are prepared from the rubber-urethane-acrylate resin, vinyl monomers and an alpha-beta olefinically unsaturated, polyester resin prepared by the following procedure:

| Reactants | Moles | Grams |
|---|---|---|
| Maleic anhydride | 3.6 | 353 |
| Tetrahydrophthalic anhydride | 6.4 | 973.8 |
| Neopentyl glycol | 9.395 | 978.40 |
| Diallyl ether of pentaerythritol | 2.81 | 607.8 |

A fusion cook of a neopentyl glycol and the tetrahydrophthalic anhydride is carried out over a 21 hour period. Water comes over at about 157° C. and a maximum temperature of about 205° C. is recorded. The resulting resin has an acid number of about 17. The maleic anhydride and the diallyl ether of pentaerythritol are added with about 1.46 grams hydroquinone and the charge is heated for about 13 hours. Water comes over at about 140° C. and a maximum temperature of about 186° C. is recorded.

A first paint dispersion is prepared by using 50 parts by weight of this polyester resin, 25 parts by weight of the rubber-urethane-acrylate resin and about 25 parts by weight methyl methacrylate. A second paint dispersion is prepared by using about 25 parts by weight of the polyester resin and about 50 parts by weight of the rubber-urethane-acrylate resin, and about 25 parts by weight methyl methacrylate. A third paint dispersion is prepared by using about 30 parts by weight of this polyester resin, about 10 parts by weight of the rubber-urethane-acrylate resin and about 60 parts by weight methyl methacrylate. A fourth paint dispersion is prepared by using about 40 parts by weight of this polyester resin, about 5 parts by weight of the rubber-urethane-acrylate resin and about 55 parts by weight of methyl methacrylate.

(VI) Coating of substrates: The dispersions prepared in V above are separately coated on substrates of steel, wood, glass and polymeric solid, i.e., acrylonitrile-butadiene-styrene copolymer, to an average depth of about 7/10 mil (0.0007 inch) and irradiated with an electron beam. The condtions of irradiation are as follows:

Potential—275 kv.
Current—30 milliamperes
Distance, emitter from workpiece—10 inches
Dose—10 mrads
Atmosphere—nitrogen

EXAMPLE 2

The procedure of Example 1 is repeated with the differences that an equimolar amount of ethyl acrylate is substituted for the butyl acrylate used in the monomer mixture to form the rubber particle and ½ of the methyl methacrylate used to form the coating dispersion with the rubber-urethane-acrylate resin and the polyester resin is replaced with an equimolar amount of styrene.

EXAMPLE 3

The procedure of Example 1 is repeated with the differences that an equimolar amount of 2-ethyl hexyl acrylate is substituted for the butyl acrylate used in the monomer component, used to form the coating solution with the rubber-urethane-acrylate resin and the polyester resin, is a mixture of 30 mole percent methyl methacrylate, 20 mole percent butyl methacrylate, 10 mole percent 2-ethyl hexyl acrylate, 20 mole percent styrene and 20 mole percent vinyl toluene.

EXAMPLE 4

The procedure of Example 1 is repeated with the differences that an equimolar amount of cyclohexyl acrylate is substituted for the butyl acrylate and an equimolar amount of 1,3-butylene diacrylate is substituted for the 1,3-butylene dimethacrylate used to form the rubber particle and the vinyl monomer component, used to form the coating dispersion with the rubber-urethane-acrylate resin and the polyester resin, is a mixture of 70 mole percent methyl methacrylate, 20 mole percent alpha methyl styrene and 10 mole percent 1,3-butylene dimethacrylate.

EXAMPLE 5

The procedure of Example 1 is repeated with the difference that an equimolar amount of 1,6-hexamethylene diacrylate is substituted for the 1,3-butylene dimethacrylate used to form the rubber particle.

EXAMPLE 6

The procedure of Example 1 is repeated with the difference that an equimolar amount of divinyl benzene is substituted for the 1,3-butylene dimethacrylate used in the monomer mixture to form the rubber particle and the vinyl monomer component, used to form the coating dispersion with the rubber-urethane-acrylate resin and the polyester resin, is a mixture of 60 mole percent methyl methacrylate, 20 mole percent styrene, 10 mole percent butyl acrylate and 10 mole percent divinyl benzene.

EXAMPLE 7

The procedure of Example 1 is repeated with the difference that a single paint dispersion is formed using 60 weight percent of the methyl methacrylate and 40 weight percent of a polymeric component of which 50 weight percent is the rubber-urethane-acrylate resin and 50 weight percent is the polyester resin.

EXAMPLE 8

The procedure of Example 1 is repeated with the difference that a single paint dispersion is formed using 40 weight percent of the methyl methacrylate and 60 weight percent of a polymeric component which is made up of 50 weight percent of the rubber-urethane-acrylate resin and 50 weight percent of the polyester resin.

EXAMPLE 9

The procedure of Example 1 is repeated except for the differences that the monoacrylate component of the monomer mixture used to form the rubber particle consists of about 5 mole percent hydroxy-ethyl methacrylate and about 95 mole percent butyl acrylate. The monomers are divided into 5 equal fractions for addition to the reaction mixture and the hydroxy ethyl methacrylate is added in the fifth or last increment.

EXAMPLE 10

The procedure of Example 1 is repeated except for the differences that the monoacrylate component of the monomer mixture used to form the rubber particle consists of about 15 mole percent hydroxy-ethyl acrylate and about 85 mole percent butyl acrylate and the diacrylate is 1,3-butylene diacrylate. The monomer mixture is divided into about 5 equal fractions and the hydroxy-ethyl acrylate is added to the fifth and last fraction.

EXAMPLE 11

The procedure of Example 1 is repeated with the differences that the curing is carried out in a helium atmosphere and the potential of the electron beam upon exit from the electron window into such atmospheres is about 295 kv.

EXAMPLE 12

The procedure of Example 1 is repeated with the differences that the curings carried out in a nitrogen atmosphere containing a minor amount of $CO_2$ and the potential of the electron beam upon exit from the electron window into such atmosphere is about 260 kv.

EXAMPLE 13

Substrates are coated in accordance with this invention using the following procedure:

(I) Rubber particles are prepared in an organic medium using the procedure set forth below:

(A) A mixture is formed from the following:

| Materials: | Grams |
| --- | --- |
| Ethyl acrylate | 60.0 |
| Hydroxyethyl methacrylate | 20.0 |
| 1,3-butylene dimethacrylate | 20.0 |
| Dispersing agent [1] | 3.0 |
| AIBN [2] | 0.5 |

[1] An amphiphatic copolymer (one portion soluble in the acrylic monomers and the other portion soluble in the solvent, e.g., dodecane) is prepared by reacting 12-hydroxystearic acid (300 g.) in the presence of stearyl alcohol (310 g.) and p-toluene sulfonic acid (6 g.) at 180°–190° C. until the acid value is less than 1 mg. KOH/g. the product is then reacted with methacrylic anhydride (170 g.). The resulting material is then copolymerized with an equal amount of methyl methacrylate using AIBN initiator (9 g.) and butyl acetate solvent. This method of producing this dispersing agent is described in detail by K. E. J. Barratt and H. R. Thomas, Journal of Polymer Science, Part A–1, vol. 7, p. 2625 (1969). Other dispersing agents which are effective for stabilizing suspensions and hydrocarbon liquids may be used in place of the above-described material.

[2] 2,2′ azobis-(2-methyl propionitrile).

(B) Two-thirds of the mixture of the above-listed materials, excepting the hydroxyethyl methacrylate, is added to 1,000 grams n-dodecane under nitrogen. The reaction mixture is warmed to 40° C. When the exotherm starts, the temperature is allowed to rise to 80° C. The temperature is maintained at 80° C. for about 10 minutes. The hydroxyethyl methacrylate and the final one-third of the other materials are added slowly. The temperature is maintained at 80° C. for 30 minutes.

(II) The hydroxy-functional rubber particles prepared in (I) above are reacted with a diisocyanate using the following procedure: Temperature of the reaction mixture is allowed to cool to 30° C. and there is slowly added 132 grams of 2,4-toluene diisocyanate. The temperature is maintained in the range of 30°–35° C. for two hours.

(III) There is added to the reaction mix 125 grams of hydroxy ethyl methacrylate. The reaction mix is then heated at 45° C. for four hours. The rubber-urethane-acrylate addition product particles are separated from the solvent by filtration.

(IV) A paint dispersion is prepared by using 40 parts by weight of an equimolar mixture of methyl methacrylate and styrene and 60 parts by weight of a polymeric component consisting of 58 parts by weight of an alpha-beta olefinically unsaturated resin and 2 parts by weight of the rubber-urethane-acrylate addition product.

This polyester resin is prepared from the following materials using the following procedure:

| Materials: | Parts by weight |
| --- | --- |
| Maleic anhydride | 147 |
| Phthalic anhydride | 429 |
| Neopentyl glycol | 503 |

Procedure: All the reactants to a four-neck flask are fitted with a stirrer, thermometer, nitrogen inlet tube and a 10-inch Vigreux column topped with a Barratt trap for removing the water of condensation. The reactants are slowly heated to 165° C. at which time the first water of condensation distills off. Nitrogen is bubbled through the reactants throughout the reaction. The reaction temperature rises as water is continuously removed until a maximum temperature of 225° C. is obtained. The column is then removed from the system, three weight percent xylene is added to aid azeotropic water removal and heating is continued until the acid number reaches 30. The product is cooled and when the temperature reaches 100° C., 0.03 weight percent hydroquinone inhibitor is added.

(V) Coating of substrates: The paint dispersion as prepared in (IV) is sprayed upon substrates of steel, aluminum, glass, paper, wood and polymeric solid, i.e., polypropylene, to an average depth of about 1.5 mils and cured thereon by placing said substrates into a nitrogen atmosphere and exposing the coated surfaces to an electron beam (potential 275 kv.-current 30 milliamperes) until the coatings are crosslinked upon the surfaces of the substrates and/or tack-free to the touch.

EXAMPLE 14

The procedure of Example 13 is repeated with the differences that an equimolar amount of 4,4′-diphenylmethane diisocyanate with one isocyanate group per molecule blocked with caprolactam is substituted for the 2,4-toluene diisocyanate in the reaction of diisocyanate with hydroxy-functional rubber in Section II of the procedure of Example 13 and the procedure of Section III of Example 13 is modified in that, as the hydroxy-ethyl methacrylate monomer is dispersed in the reaction mixture, the temperature of the reaction mixture is 50° C. while the reaction mixture is stirred for about 30 minutes.

EXAMPLE 15

The procedure of Example 13 is repeated with the differences that equimolar amounts of 1-phenoxy-2,4-phenylene diisocyanate with one isocyanate group per molecule blocked with caprolactam is substituted for the 2,4-toluene diisocyanate in the reaction of diisocyanate with hydroxy-functional rubber in Section II of the procedure of Example 13 and the procedure of Section III of Example 13 are modified in that, as the hydroxyethyl methacrylate monomer is dispersed in the reaction mixture, the temperature is raised to about 150° C. and maintained at a temperature at about 150° C. while the reaction mixture is stirred for about 30 minutes.

EXAMPLE 16

The procedure of Example 13 is repeated with the differences that an equimolar amount of 1-tert-butyl-2,4-phenylene diisocyanate with one isocyanate group per molecule blocked with caprolactam is substituted for the 2,4-toluene diisocyanate in the reaction of diisocyanate with hydroxy-functional rubber in Section II of the procedure of Example 13 and the procedure of Section III of Example 13 is modified in that, as the hydroxyethyl methacrylate monomer is dispersed in the reaction mixture, the temperature of the reaction mixture is raised to about 150° C. and maintained at a temperature of about 150° C. while the reaction mixture is stirred for about 30 minutes.

EXAMPLE 17

The procedure of Example 13 is repeated with the differences that an equimolar amount of 1-ethyl-2,4-phenylene diisocyanate with one isocyanate group per molecule blocked with caprolactam is substituted for the 2,4-toluene diisocyanate in the reaction of diisocyanate with hydroxy-functional rubber in Section II of the procedure of Example 13 and the procedure of Section III of Example 13 is modified in that, as the hydroxyethyl methacrylate monomer is dispersed in the reaction mixture, the temperature of the reaction mixture is raised to about 150° C. and maintained at a temperature of about 150° C. while the reaction mixture is stirred for about 30 minutes.

EXAMPLE 18

The procedures of Examples 1 and 13 are repeated except for the difference that a functionally equivalent amount of 1,1,1-trimethylolethane triacrylate is substituted for the 1,3-butylene dimethacrylate in the formation of the hydroxy-functional rubber particle.

EXAMPLE 19

The procedures of Examples 1 and 13 are repeated except for the differences that a functionally equivalent amount of 1,1,1-trimethylolpropane triacrylate is substituted for the 1,3-butylene dimethacrylate in the formation of the hydroxy-functional rubber particle.

EXAMPLE 20

The procedures of Examples 1 and 13 are repeated except for the difference that a functionally equivalent amount of 1,4-dimethylolcyclohexane dimethacrylate is substituted for the 1,3-butylene dimethacrylate in the formation of the hydroxy-functional rubber particle.

EXAMPLE 21

The procedures of Examples 1 and 13 are repeated with the differences that the alpha-beta olefinically unsaturated polyester is prepared from the following materials using the following procedures:

| Materials: | Parts by wt. |
|---|---|
| Maleic anhydride | 14.7 |
| Tetrahydrophthalic anhydride | 72.3 |
| Neopentyl glycol | 75.7 |
| Dibutyl tin oxide | 7.06 |

Procedure: To a reaction vessel, the reactants are charged and then heated to about 340° F. and held at this temperature for one hour. The temperature of the charge is then raised to about 440° F. and maintained at such temperature until the acid number of the resultant resin is below about 20. The excess glycol and the water reaction are removed by vacuum and when the acid number is below about 10 there are added about 14.5 grams hydroquinone. The charge is allowed to cool.

EXAMPLE 22

The procedure of Example 21 is repeated except that a functionally equivalent amount of 1,2-cyclohexene dicarboxylic acid anhydride is substituted for the tetrahydrophthalic anhydride (4-cyclohexene-1,2-dicarboxylic anhydride).

EXAMPLE 23

The procedure of Example 21 is repeated except that ⅓ of the neopentyl glycol is replaced with a functionally equivalent amount of pentaerythritol.

EXAMPLE 24

The procedure of Example 21 is repeated except that a functionally equivalent amount of ethylene glycol is substituted for the neopentyl glycol.

EXAMPLE 25

The procedure of Example 21 is repeated except that a functionally equivalent amount of 2-butene-1,4-diol is substituted for the neopentyl glycol.

EXAMPLE 26

The procedure of Example 21 is repeated except that a functionally equivalent amount of 1,6-hexamethylene glycol is substituted for the neopentyl glycol.

EXAMPLE 27

The procedure of Example 21 is repeated except that a functionally equivalent amount of fumaric acid is substituted for the maleic anhydride.

EXAMPLE 28

The procedure of Example 13 is repeated except that a functionally equivalent amount of chloromaleic anhydride is substituted for the maleic anhydride.

EXAMPLE 29

The procedures of Examples 1 and 13 are repeated with the differences that the alpha-beta olefinically unsaturated polyester is prepared from the following materials using the following procedures:

| Materials | Moles | Grams |
|---|---|---|
| Succinic acid | 2.88 | 340.1 |
| Tetrahydrophthalic anhydride | 9.12 | 1,387.6 |
| 1,2-propane diol | 13.20 | 1,004.6 |

The monomers with 200 cc. xylene are subjected to a solvent cook for a period of eight hours gradually raising the temperature to 260° C. The resultant resin has an acid number of about 14. The mixture is then cooled to about 90° C. then 90 grams of dibutyl tin-oxide, 370 grams of 2-hydroxyethyl methacrylate, and 10 grams of hydroquinone are added. The esterification reaction is continued until the acid number is about 4.5.

EXAMPLE 30

The procedures of Examples 1 and 13 are repeated with the differences that the alpha-beta olefinically unsaturated polyester is a urethane-modified polyester prepared from the following materials using the following procedures:

| Materials | Moles | Grams |
|---|---|---|
| Succinic acid | 2.88 | 340.1 |
| Tetrahydrophthalic anhydride | 9.12 | 1,387.6 |
| 1,2-propane diol | 13.20 | 1,004.4 |

The monomers with 200 cc. xylene are subjected to a solvent cook over a period of 10 hours gradually raising the temperature to 260° C. The resultant resin has acid number of about 5.7. The xylene is separated from the resin and a solution of the resin and styrene is prepared to which is sequentially added toluene diisocyanate and 2-hydroxyethyl methacrylate. The composition of this reaction mixture is as follows:

| Materials | Moles | Grams |
|---|---|---|
| Resin A | | 200 |
| Toluene diisocyanate | 0.1 | 17.4 |
| Styrene | 0.82 | 86 |
| 2-hydroxyethyl methacrylate | 0.1 | 13 |

The addition of the diisocyanate is made slowly and incrementally and the charge is continuously stirred over a period of 5.5 hours to form resin B. The methacrylate is then added slowly and incrementally and the charge is continuously stirred over a period of 25 hours to form resin C.

The monomer content is adjusted in accordance with the monomer content set forth in Examples 1 and 13 by addition of styrene where necessary and the removal of styrene by vacuum distillation where necessary. To this resin-monomer mix is then added the rubber-urethane-acrylate addition product in the amounts employed in Examples 1 and 13 respectfully. The composition is applied to substrates and cured in accordance with the procedures of Examples 1 and 13 respectively.

EXAMPLE 31

The procedures of Examples 1 and 13 are repeated with the differences that the alpha-beta olefinically unsaturated polyester employed is siloxane-modified polyester prepared from the following materials using the following procedures:

To a reaction vessel are charged 70 lbs. of neopentyl glycol, 10 lbs. of xylene and 35 lbs. of a commercially available (Dow Corning Z-6018) hydroxy-functional, cyclic, polysiloxane having the following properties:

The hydroxy content, Dean-Stark:

| | |
|---|---|
| Percent condensable | 5.5 |
| Percent free | 0.5 |
| Average molecular weight | 1600 |
| Combined weight | 400 |
| Refractive index | 1.531–1.539 |
| Softening point, Durran's mercury method | 200 |

At 60 percent solids in xylene:

Specific gravity at 77° F. ---------------------- 1.075
Viscosity at 77° F., centipoises ---------------- 33
Gardner-Holdt ---------------------------------- A-1

The charge is heated to about 345° F. (174° C.) for 2.5 hours, after which there is added 13.7 lbs. maleic anhydride, 52.4 lbs. tetrahydrophthalic anhydride and 100 grams of dibutyl tin oxide.

The temperature of the charge is raised slowly to about 430° F. (221° C.) and this temperature is maintained until the resulting resin has an acid number of about 10. Some of the xylene and water of reaction are removed during the cook and the excess is then removed by vacuum. To the charge is added 12.6 grams hydroquinone and the charge is cooled.

EXAMPLE 32

The procedure of Example 1 is repeated with the difference that the paint dispersion consists of 40 parts by weight of an equimolar mixture of methyl methacrylate and styrene and 60 parts by weight of the polymeric component consisting of 55 parts by weight of the alpha-beta olefinically unsaturated polyester resin and about 5 parts by weight of the rubber-urethane-acrylate addition product.

EXAMPLE 33

The procedure of Example 13 is repeated with the difference that the paint dispersion consists of 40 parts by weight styrene and 60 parts by weight of a polymeric component consisting of 50 parts by weight of the alpha-beta olefinically unsaturated polyester resin and about 10 parts by weight of the rubber-urethane-acrylate addition product.

EXAMPLE 34

The procedure of Example 1 is repeated with the difference that the paint dispersion consists of 40 parts by weight methyl methacrylate and styrene and equimolar mixture and 60 parts by weight of a polymeric component consisting of 5 parts by weight of the alpha-beta olefinically unsaturated polyester resin and 55 parts by weight of the rubber-urethane-acrylate addition product.

EXAMPLE 35

The procedure of Example 13 is repeated with the difference that the paint dispersion consists of 60 parts by weight of a vinyl monomer mixture made up of 30 mole percent methyl methacrylate, 20 mole percent ethyl acrylate, 10 mole percent butyl methacrylate, 10 mole percent butyl acrylate, 15 mole percent 2-ethyl hexyl acrylate and 15 mole percent styrene and 40 parts by weight of a polymeric component consisting of about 10 parts by weight of the olefinically unsaturated polyester resin and about 50 parts by weight of the rubber-urethane-acrylate addition product.

EXAMPLE 36

The procedure of Examples 1 and 13 are repeated except that the depth of coating is varied in separate tests using films of 0.2, 0.5, 1.0, 2.0 and 3.5 mils. Irradiation is continued until the films are tack-free to the touch.

Terms "acrylate" and "acrylates," when used herein without a modifier distinguishing between esters of acrylic acid and a methacrylic acid, shall be understood to include both. This, of course, does not apply to a naming of a specific compound.

It will be understood by those skilled in the art that modifications can be made within the foregoing examples in the scope of the invention as hereinbefore described and hereinafter claimed.

We claim:

1. A radiation-curable paint which on a pigment and mineral filler-free basis comprises a film-forming dispersion of about 20 to about 80 weight percent vinyl monomers and about 80 to about 20 weight percent of a polymeric component consistinng essentially of (A) about 2 to about 98 weight percent of an alpha-beta olefinically unsaturated polyester resin having average molecular weight between about 1,000 and about 20,000 and containing between 0.5 and 5 units of alpha-beta olefinic unsaturation per 1,000 units molecular weight, said polyester having as constituent monomers at least one dicarboxylic acid or anhydride and at least one polyhydric alcohol, and (B) about 98 to about 2 weight percent of a rubber-urethane-acrylate addition product formed by reacting a first isocyanate group of diisocyanate with a hydroxy-functional elastomeric particle of crosslinked acrylic polymer and reacting the remaining isocyanate group of said diisocyanate with a hydroxyalkyl acrylate, said particle of crosslinked acrylic rubber consisting essentially of (1) about 10 to about 90 weight percent of a core of crosslinked acrylic polymer consisting essentially of
(a) a minor and crosslinking amount of a di- or trifunctional monomer containing 2 or more nonconjugated terminal ethylenic groups, said minor and crosslinking amount not exceeding about 20 mole percent of the core reactants, and
(b) a remainder consisting essentially of a monoacrylate component which consists essentially of about 65 to about 98 mole percent of a monoester of acrylic acid and a $C_2$–$C_8$ monohydric alcohol and about 2 to about 35 mole percent of a hydroxy-functional acrylate selected from hydroxy ethyl acrylate, hydroxyethyl methacrylate, hydroxypropyl acrylate and hydroxypropyl methacrylate.

2. A paint in accordance with claim 1 wherein said di- or tri-functional monomer containing 2 or more nonconjugated terminal ethylenic groups is selected from the group consisting of divinyl benzene, a diester of acrylic or methacrylic acid and a $C_2$–$C_8$ dihydric alcohol or a triester of acrylic acid or methacrylic acid and a $C_2$–$C_8$ trihydric alcohol.

3. A paint in accordance with claim 1 wherein said polyester has average molecular weight in the range of about 2,000 to about 10,000.

4. A paint in accordance with claim 1 wherein said particle of crosslinked acrylic rubber has average diameter in the range of about 0.05 to 0.2 micron.

5. A paint in accordance with claim 1 wherein said particle of crosslinked acrylic rubber is a copolymer of a monoacrylate selected from the group consisting of butyl acrylate and 2-ethyl hexyl acrylate and a diacrylate selected from 1,3-butylene diacrylate and 1,3-butylene dimethylacrylate.

6. A paint in accordance with claim 1 wherein the diisocyanate used to prepare said rubber-urethane-acrylate addition product is toluene diisocyanate.

7. A paint in accordance with claim 1 wherein said vinyl monomers are selected from esters of acrylic or methacrylic acid and a $C_1$–$C_8$ monohydric alcohol, $C_8$–$C_9$ monovinyl hydrocarbons and 0 to 30 mole percent of a difunctional compound selected from divinyl benzene and diesters of acrylic or methacrylic acid and a $C_2$–$C_6$ dihydric alcohol.

8. A paint in accordance with claim 1 wherein said polyester has average molecular weight in the range of about 2,000 to about 10,000 and containing about 0.7 to about 3.5 units of alpha-beta olefinic unsaturation per 1,000 units molecular weight.

9. A paint in accordance with claim 1 wherein said minor and crosslinking amount constitutes about 2 to about 20 mole percent of the core reactants and said remainder constitutes about 80 to about 98 mole percent of the same.

10. The method of coating a substrate which comprises: (I) applying to the surface of said substrate a film of radiation-curable paint which on a pigment and mineral filler-free basis comprises a film-forming dispersion of about 20 to about 80 weight percent vinyl monomers and about 80 to about 20 weight percent of a polymeric component consisting essentially of (A) about 2 to about 98 weight percent of an alpha-beta olefinically unsaturated polyester resin having average molecular weight between about 1,000 and about 20,000 and containing between 0.5 and 5 units of alpha-beta olefinic unsaturation per 1,000 units molecular weight, said polyester having as constituent monomers at least one dicarboxylic acid or anhydride and at least one polyhydric alcohol, and (B) about 98 to about 2 weight percent of a rubber-urethane-acrylate addition product formed by reacting a first isocyanate group of diisocyanate with a hydroxy-functional elastomeric particle of crosslinked acrylic polymer and reacting the remaining isocyanate group of said diisocyanate with a hydroxyalkyl acrylate, said particle of crosslinked acrylic rubber consisting essentially of (1) about 10 to about 90 weight percent of a core of crosslinked acrylic polymer consisting essentially of (a) a minor and crosslinking amount of a di- or tri-functional monomer containing 2 or more non-conjugated terminal ethylenic groups, said minor and crosslinking amount not exceeding about 20 mole percent of the core reactants, and (b) a remainder consisting essentially of a monoacrylate component which consists essentially of about 65 to about 98 mole percent of a monoester of acrylic acid and a $C_2$–$C_8$ monohydric alcohol and about 2 to about 35 mole percent of a hydroxy-functional acrylate selected from hydroxy ethyl acrylate, hydroxyethyl methacrylate, hydroxypropyl acrylate and hydroxypropyl methacrylate, and (II) crosslinking said film upon said substrate by exposing said substrate to a beam of electrons having average energy in the range of about 100,000 to about 500,000 electron volts.

References Cited

UNITED STATES PATENTS

| | | | |
|---|---|---|---|
| 3,423,481 | 1/1969 | Mizutani | 260—836 |
| 3,437,514 | 4/1969 | Burlant | 117—93.31 |
| 3,450,796 | 6/1969 | Griffin | 260—885 |
| 3,502,745 | 3/1970 | Minton | 260—878 |
| 3,509,234 | 4/1970 | Burlant | 260—859 |
| 3,528,844 | 9/1970 | Burlant | 260—859 |

PAUL LIEBERMAN, Primary Examiner

U.S. Cl. X.R.

260—77.5 CR, 77.5 TB, 859, 862, 885